April 22, 1941.   L. D. HAGENBOOK   2,239,521
SHAKER CONVEYER
Filed Oct. 14, 1939   2 Sheets-Sheet 1
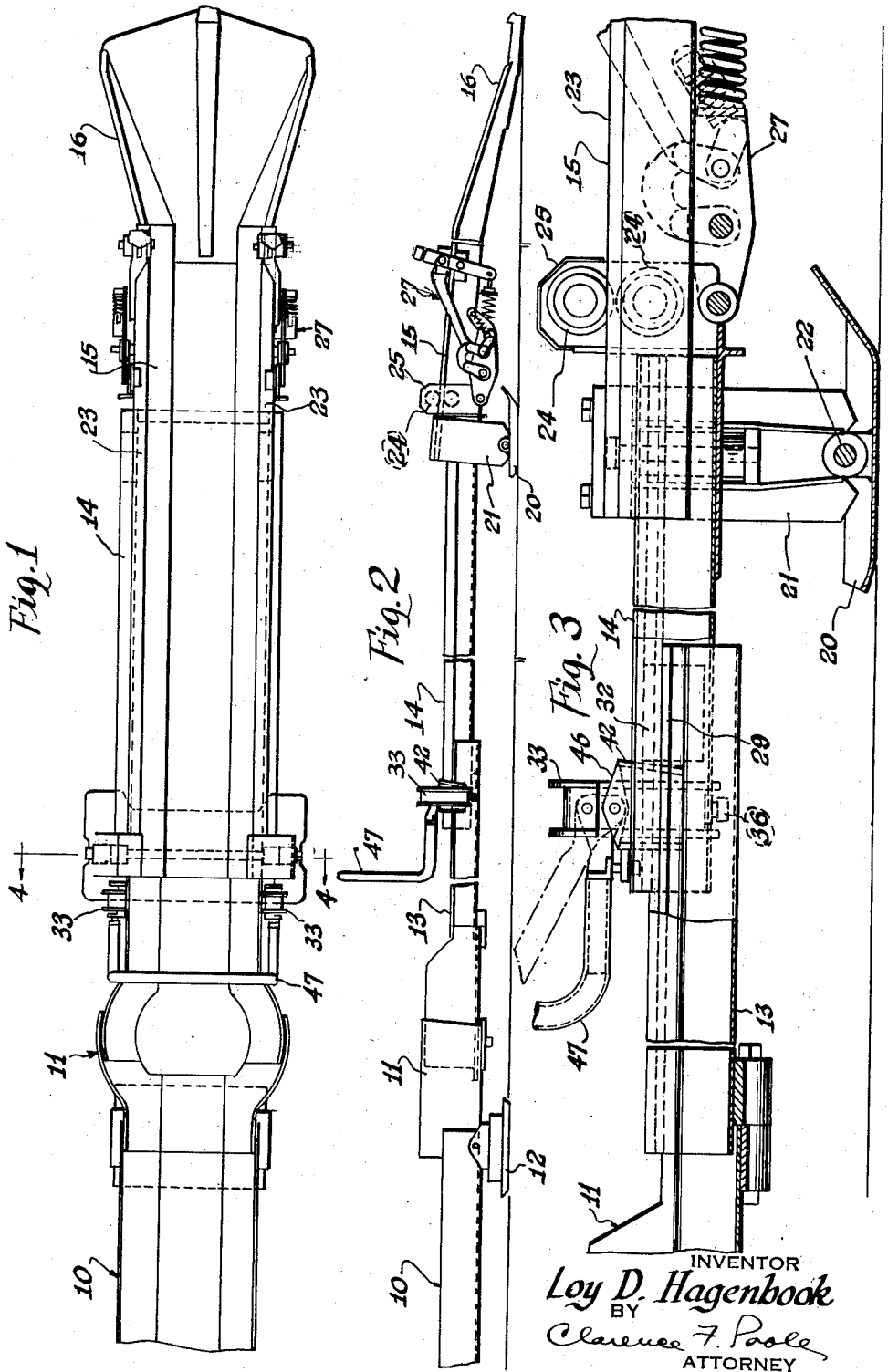
INVENTOR
Loy D. Hagenbook
BY
Clarence F. Poole
ATTORNEY April 22, 1941.  L. D. HAGENBOOK  2,239,521
SHAKER CONVEYER
Filed Oct. 14, 1939  2 Sheets-Sheet 2
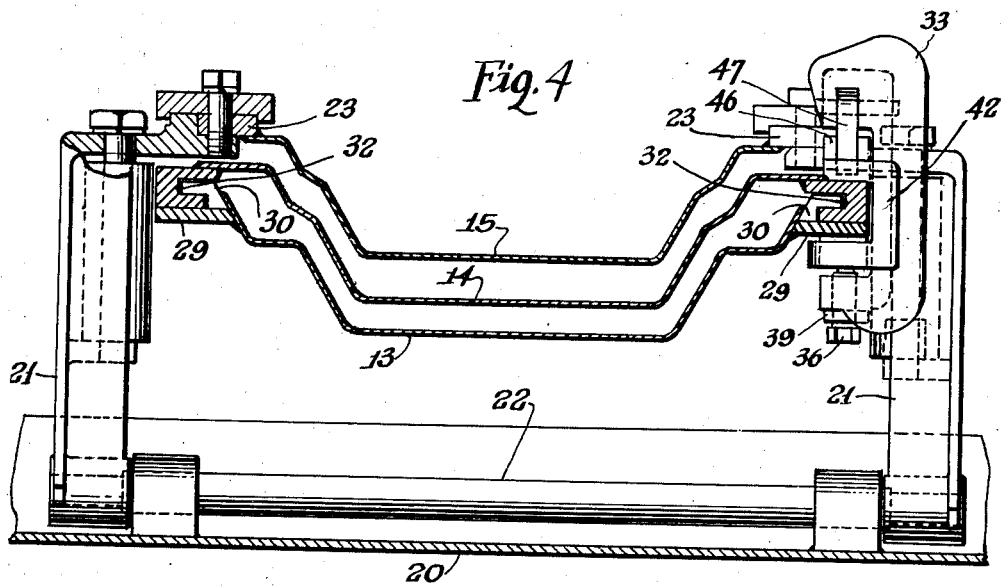
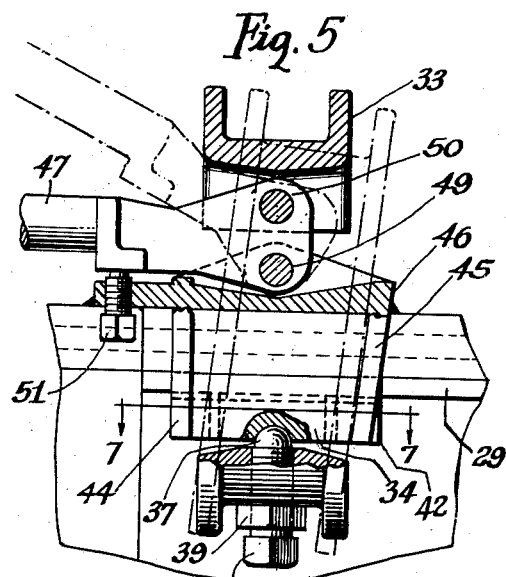
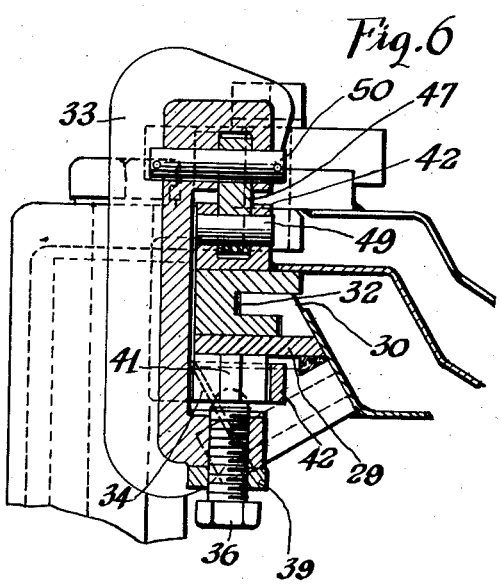
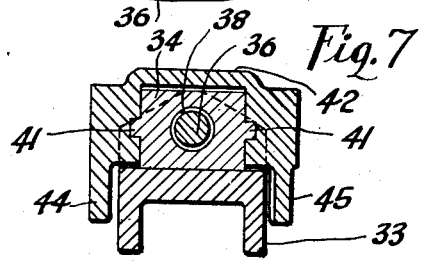
INVENTOR
Loy D. Hagenbook
BY
Clarence F. Prall
ATTORNEY Patented Apr. 22, 1941

2,239,521

UNITED STATES PATENT OFFICE 2,239,521

SHAKER CONVEYER

Loy D. Hagenbook, Chicago, Ill., assignor to Goodman Manufacturing Company, Chicago, Ill., a corporation of Illinois Application October 14, 1939, Serial No. 299,475

9 Claims. (Cl. 198—220)

This invention relates to improvements in shaker conveyers, and more particularly to an extensible trough connection between a plurality of troughs in a shaker conveyer trough line.

Among the objects of my invention are to provide a novel and improved trough connection between a plurality of trough sections of a shaker conveyer, permitting said trough sections to be extended or telescopically retracted with respect to each other by the action of the conveyer, to avoid disassembling the trough line to increase its length for more than one trough length, together with a novel and simplified form of clamping arrangement for extending or retracting an intermediate and forward extensible trough section with respect to a reciprocating trough section fixed to the conveyer.

Another object of my invention is to provide a novel form of connection between a reciprocating trough section and an extensible trough section of a shaker conveyer, so arranged as to permit said trough sections to be positively clamped together and reciprocate as a unit, or permit said extensible trough section to be extended or retracted with respect to said reciprocating trough section, which includes a simplified form of clamping arrangement at the rear of said extensible trough section which is arranged to act as a means for feeding said extensible trough section by the action of the conveyer.

Other objects of my invention will appear from time to time as the following specification proceeds, and with reference to the accompanying drawings wherein:

Figure 1 is a plan view of a shaker conveyer trough line constructed in accordance with my invention;

Figure 2 is a fragmentary view in side elevation of the device shown in Figure 1 with the trough sections shown in extended relation with respect to each other;

Figure 3 is an enlarged detail fragmentary view in side elevation of the device shown in Figure 1, with certain parts broken away and certain other parts shown in longitudinal section;

Figure 4 is a transverse sectional view taken substantially along line 4—4 of Figure 1;

Figure 5 is an enlarged detail fragmentary longitudinal sectional view of the clamping arrangement for extending or retracting the intermediate trough section;

Figure 6 is a fragmentary transverse sectional view of the clamping arrangement shown in Figure 5; and Figure 7 is a fragmentary sectional view taken substantially along line 7—7 of Figure 5.

In the drawings, my invention is shown as being incorporated in a shaker conveyer trough line 10 including a swivel 11 mounted on a shoe, 12, which is slidably movable along the ground (see Figure 2). A reciprocating trough section 13 is detachably secured to the forward end of said swivel, in a usual manner, and is adapted to have an intermediate extensible trough section 14 nested therein or extended therefrom. Said intermediate trough section is in turn slidably mounted at its forward end on an extensible trough section 15, which is adapted to be nested within or extended from said intermediate trough section. The purpose of said swivel is to permit horizontal swinging movement of said reciprocating and intermediate and forward extensible trough sections, to permit a shovel 16 on the forward end of said forward extensible trough section to be laterally positioned with respect to the longitudinal center line of the conveyer, to pick up loose material from remote places of a working place of a mine.

The extensible trough section 15 is of a usual construction and is pivotally mounted at its rear end on a shoe 20 adapted to slidably engage the ground. Said shoe supports the rear end of said extensible trough section above the ground by means of a pair of spaced apart vertical legs 21, 21, mounted on the ends of a transverse shaft 22 mounted on said shoe (see Figure 4). Said extensible trough section is likewise provided with a pair of spaced apart bearing plates 23, 23 extending along and projecting laterally from the upper flanges thereof, which bearing plates form a track along which rollers 24, 24 may ride to support said reciprocating trough section for slidable movement along said extensible trough section. Said rollers are mounted on opposite sides of a bracket 25 secured to and projecting forwardly from said intermediate trough section.

The extensible trough section 15 is extended from or retracted within said intermediate trough section by means of a suitable friction grip type of feeding mechanism pivotally mounted on the forward end of the bracket 25, adjacent opposite sides thereof and generally indicated by reference character 27. Said feeding mechanism is of the usual friction grip type clearly shown and described in a prior application Serial No. 187,145, filed by Ernst R. Bergmann on January 27, 1938, and is no part of my present invention so will not herein be shown or described in detail.

With reference now in particular to the novel form of guiding connection between the trough sections 13 and 14 and the novel clamping arrangement for extending or retracting the intermediate trough section 14 with respect to the trough section 13 and locking said trough sections in fixed relation with respect to each other, the trough section 13 is provided with a pair of bearing plates 29, 29 extending along opposite sides thereof, adjacent the upper end thereof, and projecting laterally from said trough section. A retaining member 30 extends along each side of said trough section. Said retaining members are mounted on the upper sides of said bearing plates, adjacent each side of said trough section. Each of said retaining members has a laterally projecting upper end spaced above the respective bearing plate 29, and said projecting end with the upper side of said respective bearing plate forms a channelled guide to permit the trough section 14 to be guided for extensible or retractible movement along said reciprocating trough section. Channeled guide members 32, 32 extend along opposite sides of said intermediate trough section and are secured to the underside of the upper flange thereof and project laterally therefrom. The channelled portions of said guide members are adapted to receive the outwardly projecting ends of the retaining members 30, 30, and the lower portions of said guide members extend within the space between said retaining members and the bearing plates 29, 29, to guide said trough sections against longitudinal and vertical displacement with respect to each other.

The novel form of clamping means for locking the trough sections 13 and 14 together and extending the trough section 14 with respect to the trough section 13 or retracting said first mentioned trough section within said last mentioned trough section includes a pair of clamping members 33, 33 mounted at the rear end of said intermediate trough section and herein shown as being of a substantially C-shaped formation. Said clamping members are adapted to be operated simultaneously to clamp bearing blocks 34, 34 with or permit said blocks to be released from said reciprocating trough section during certain strokes of the conveyer, to positively extend or retract the intermediate trough section 14 with respect to said reciprocating trough section, by the action of the conveyer, and each of said clamping members is of a similar construction so one only need herein be described in detail.

The plate 29 and channelled guide member 32 extend within the open portion of the clamping member 33. Said clamping member is provided with a set screw 36 threaded in its lower inwardly projecting end, which has a semi-spherical face 37 adapted to engage a corresponding socket formed in the underside of the bearing block 34. A lock nut 39 is provided to lock said set screw in position. Said bearing block is provided with ribs 41, 41 projecting from opposite sides thereof, which are guided for slidable movement in a guide member 42 secured to the upper side of the channelled guide 32 and depending therefrom and having a lower end extending inwardly beneath the bearing plate 29. The guide member 42 is provided with a pair of laterally spaced upwardly projecting ribs 44 and 45 extending along opposite sides of the clamping member 33 and adapted to limit pivotal movement thereof about the point of engagement of the spherical face 37 of the set screw 36 with the socket formed in the underside of the block 34 (see Figure 5).

The clamping members 33, 33 are rocked by means of a bail 47 pivotally mounted at its opposite ends on fulcrum portions 46, 46 of the guide members 42, 42, by means of pivotal pins 49, 49. Said fulcrum portions project upwardly from the upper sides of the channelled guide members 32, 32 and are formed integral with the guide members 42, 42 and extend within the open part of the clamping members 33, 33. Other pivotal pins 50, 50, spaced from the pivotal pins 49, 49, are provided to pivotally connect opposite ends of said bail to said clamping members and permit said bail to act as a lever to positively rock said clamping members about the point of engagement of the spherical faces 37, 37 of the set screws 36, 36 with the sockets in the underside of the bearing blocks 34, 34. Set screws 51, 51 are provided to limit downward pivotal movement of said bail. Said set screws are threaded in the guide members 42, 42 and their ends are adapted to abut the underside of opposite ends of the bail 47. Said set screws may be adjusted to permit the positioning of the centers of the pins 49 and 50 past dead center with respect to the axis about which said clamping members rock, so said bail may form a positive lock to lock the clamping members 33, 33 from rocking movement and lock the trough sections 13 and 14 for movement together.

It may be seen from the foregoing that since the centers of the pins 49 and 50 are spaced from each other, a linkage connection between said intermediate trough section and the bearing blocks 34, 34 is provided, which is similar to a toggle linkage connection, and that upon movement of said clamping members from the position shown by solid lines in Figure 5 to the position shown by broken lines in said figure, the set screws 36, 36 will be released from the underside of the blocks 34, 34, to permit disengagement of said blocks from the bearing plates 29, 29 and permit the reciprocating trough section 13 to telescopically move with respect to the extensible trough section 14. When said bail is moved in an opposite direction, the spherical faces 37, 37 of said set screws engage said blocks with the underside of the bearing plate 29, to lock said trough sections for reciprocable movement together. Thus, when it is desired to extend said intermediate trough section with respect to said reciprocating trough section, the blocks 34, 34 are engaged with the underside of the plates 29, 29 upon the forward stroke of the conveyer by rearward movement of the bail 47, and are released from said plates upon the return stroke of the conveyer by rocking movement of said bail and clamping member in a forward direction. When it is desired to retract said intermediate trough section with respect to said reciprocating trough section, said blocks are engaged with said bearing plates upon the return stroke of the conveyer and released therefrom upon the forward stroke of the conveyer.

It may thus be seen that a new and improved extensible trough connection, of a novel construction, has been provided between a plurality of troughs of a shaker conveyer trough line, permitting extension of the trough line by the action of the conveyer for more than one trough length, or permitting said trough sections to be locked and thus increasing the flexibility of the conveyer and the ease with which the shovel 16 may be extended or be positioned in far corners of a working place, to pick up loose material.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. An apparatus for extending or retracting one portion of a shaker conveyer trough line with respect to another or locking said portions of said trough line together including a clamping member extending above and below the flanges of two trough sections of a shaker conveyer trough line, a slidable block adapted to engage the underside of one of said flanges, said clamping member having a portion extending beneath said block, a pivotal connection between said portion of said clamping member and the underside of said block, and means for rocking said clamping member upon certain strokes of the conveyer, for positively engaging said block with its associated flange, or permitting said block to be disengaged from said flange.

2. An apparatus for extending or retracting one portion of a shaker conveyer trough line with respect to another or locking said portions of said trough line together including a clamping member extending above and below the flanges of two trough sections of a shaker conveyer trough line, a slidable block adapted to engage the underside of one of said flanges, said clamping member having a portion extending beneath said block, a pivotal engaging connection between said portion of said clamping member and the underside of said block, and means pivotally connected to said other flange and manually operable to rock said clamping member upon certain strokes of the conveyer, for positively engaging said block with its associated flange, or permitting said block to be disengaged from said flange.

3. An apparatus for extending or retracting one portion of a shaker conveyer trough line with respect to another including a clamping member extending above and below the flanges of two trough sections of a shaker conveyer trough line, a slidable block adapted to engage one of said flanges, a pivotal engaging connection between said clamping member and block, and a lever arm pivotally connected between said other flange and clamping member, manually operable to rock said clamping member about its point of engagement with said block to positively engage said block with its associated flange.

4. An apparatus for extending or retracting one portion of a shaker conveyer trough line with respect to another including a clamping member extending above and below the flanges of two trough sections of a shaker conveyer trough line, a slidable block adapted to engage one of said flanges, a pivotal engaging connection between said clamping member and block, and a lever arm pivotally connected between said other flange and clamping member at spaced apart parallel axes and manually operable to rock said clamping member about its point of engagement with said block to positively engage said block with its associated flange, and lock said block in engagement therewith.

5. In a shaker conveyer trough line, a pair of conveyer trough sections, one of which is adapted to be nested within the other, means operable by reciprocable movement of the conveyer for extending or retracting one of said trough sections with respect to the other including a flange projecting laterally from each upper side of each of said trough sections, a pair of clamping members, each of said clamping members having portions extending above and below an abutting pair of said flanges of said trough sections, a block mounted for slidable movement towards and from each pair of abutting flanges, pivotal connections between said blocks and clamping members, and means for simultaneously rocking said clamping members during certain strokes of the conveyer to positively engage said blocks with their associated flanges.

6. In a shaker conveyer trough line, a pair of conveyer trough sections, one of which is adapted to be nested within the other, means operable by reciprocable movement of the conveyer for extending or retracting one of said trough sections with respect to the other including flanges projecting laterally from each of said trough sections, a pair of clamping members extending above and below opposite of said flanges, blocks mounted for slidable movement towards and from said flanges of one of said trough sections, pivotal connections between said blocks and clamping members, and a rocking lever having pivotal connection with opposite clamping members at its ends, for rocking said clamping members and positively engaging said blocks with their associated flanges.

7. In a shaker conveyer trough line, a pair of conveyer trough sections, one of which is adapted to be nested within the other, means operable by reciprocable movement of the conveyer for extending or retracting one of said trough sections with respect to the other including flanges projecting laterally from each of said trough sections, a pair of clamping members extending above and below opposite of said flanges, blocks mounted for slidable movement towards and from said flanges of one of said trough sections, pivotal connections between said blocks and clamping members, and a rocking lever having pivotal connection with opposite clamping members at its ends, and having pivotal connection with opposite flanges at axes spaced from the axes of pivotal connection of said lever arm to said clamping members, for rocking said clamping member and positively engaging said blocks with their associated flanges.

8. In a shaker conveyer trough line, a pair of conveyer trough sections, one of which is adapted to be nested within the other, means operable by reciprocable movement of the conveyer for extending or retracting one of said trough sections with respect to the other including flanges projecting laterally from each of said trough sections, a clamping member extending above and below adjacent flanges of said trough sections, a block mounted for slidable movement towards and from one of said flanges, a pivotal bearing connection between said block and clamping member, to permit said clamping member to engage said block with its associated flange, and a member for rocking said clamping member, said member having pivotal connection with said opposite flanges, and the connection between said member and clamping members being such that said member produces a toggle action for positively engaging said block with its associated flange.

9. In a shaker conveyer trough line, a pair of conveyer trough sections, one of which is adapted to be nested within the other, means operable by reciprocable movement of the conveyer for extending or retracting one of said trough sections with respect to the other including flanges projecting laterally from each of said trough sections, a clamping member extending above and below adjacent flanges of said trough sections, a block guided for movement towards and from one of said flanges, a pivotal bearing connection between the side of said block opposite from said flange and one end of said clamping member, and means for rocking said clamping member during certain strokes of the conveyer to positively engage said block with its associated flange, or permit said block to be released therefrom comprising a lever arm connected between said flange opposite from said block and said clamping member, at spaced apart pivotal axes, in such a manner that said lever arm and clamping member produce a toggle action, for positively engaging said block with its associated flange.

LOY D. HAGENBOOK.